March 2, 1943.  E. E. BERRY  2,312,519
BALANCED SEAL FOR SUCTION ROLLS
Filed June 10, 1939   2 Sheets-Sheet 1
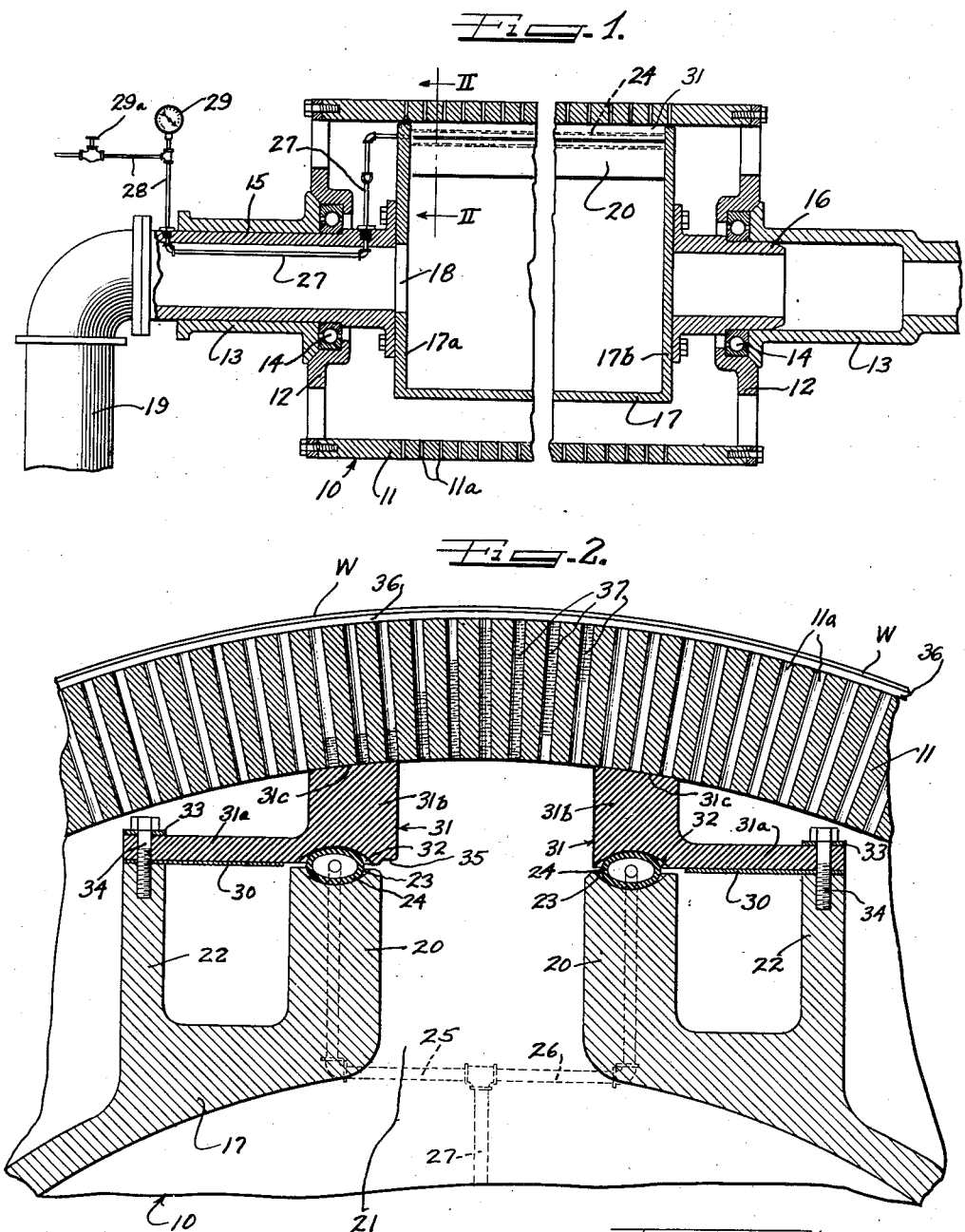
Inventor
EARL E. BERRY.

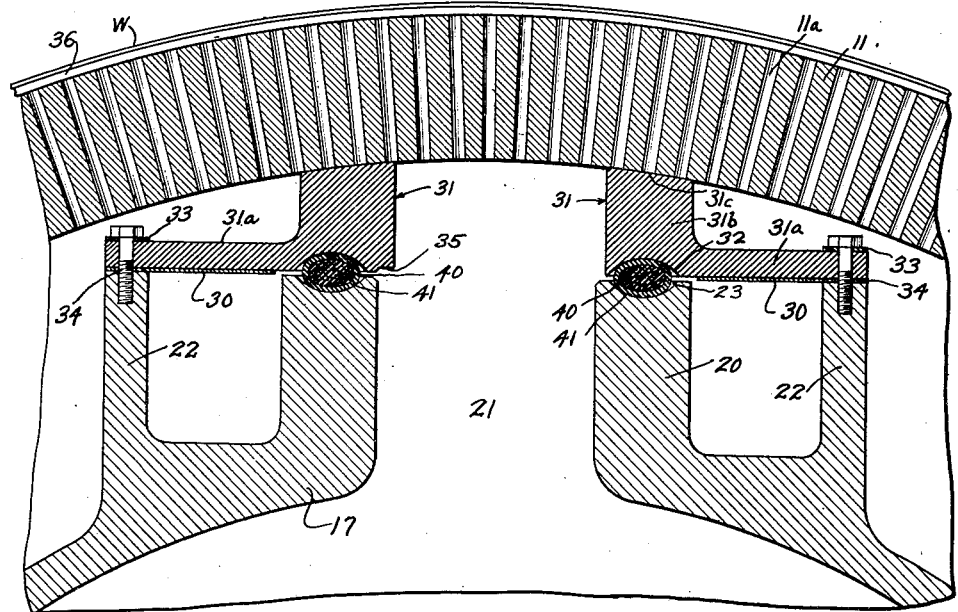
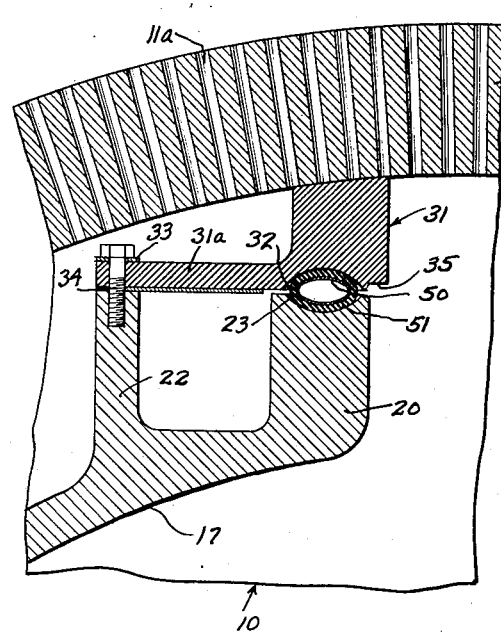
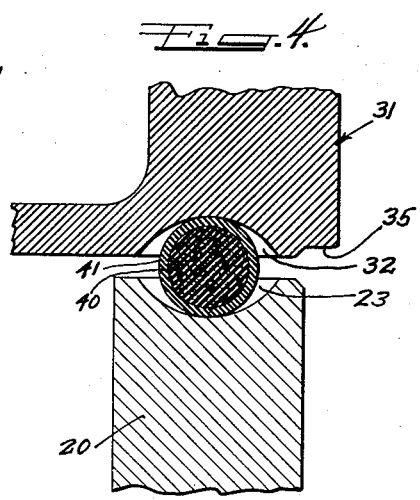

Patented Mar. 2, 1943

2,312,519

UNITED STATES PATENT OFFICE 2,312,519

BALANCED SEAL FOR SUCTION ROLLS

Earl E. Berry, Beloit, Wis., assignor to Beloit Iron Works, Beloit, Wis., a corporation of Wisconsin Application June 10, 1939, Serial No. 278,383

11 Claims. (Cl. 92—53)

This invention relates to suction rolls for paper making machines and the like and more particularly relates to a simple balanced seal construction for suction rolls wherein the off-going seal of the roll is balanced to eliminate undesired friction and wear of the seal.

The usual suction roll includes a stationary suction head or gland mounted in a perforated or radially drilled revolvable metal cylinder. This suction head or gland has an opening along the length thereof communicating with the inside of the cylinder and seals are carried by the head or gland on each side of the opening to limit communication of the opening to a localized portion of the cylinder. The rotating cylinder must necessarily have some rubbing contact against these seals in order to prevent leakage. Such rubbing action involves friction losses and wear. It is, therefore, highly desirable that the seals be urged against the revolving cylinder with a force that is just sufficient to effect sealing without, however, causing undue friction losses and wear.

It is also highly desirable to "float" the seals on the suction head or gland and to resiliently urge the seals toward the cylinder in order to accommodate cylinder deflection, wear take-up, and irregularities on the inner surface of the cylinder. Therefore, immovable mountings for the seals on the head or gland are not used.

It has been found that passage of the perforations or holes in the revolving cylinder over the localized suction area defined by the seals causes an evacuation of the holes since the same are covered on the outer periphery of the cylinder with a felt and/or a fibrous sheet to be dried by suction treatment on the roll. The suction or sub-atmospheric pressure in these evacuated holes acts on a "floating" off-going seal as the holes pass over the seal and tends to draw this off-going seal tightly against the cylinder thereby inducing frictional losses and wear on the seal. The oncoming seal is not subjected to such conditions since the holes passing over this seal are not evacuated.

Now, if the seals are initially set, under atmospheric pressures, to have just the desired contact with the interior of the cylinder, it follows that the "floating" off-going seal will be drawn too tightly against the cylinder upon operation of the suction roll under vacuum. Furthermore, if this off-going seal is initially set to have the desired contact with the cylinder under a given vacuum or sub-atmospheric pressure in the holes passing thereover, fluctuations in this vacuum will affect the position of the seal. Thus a higher vacuum will draw up the seals too tightly, while a lower vacuum might allow sufficient clearance between the seal and cylinder to effect leakage.

According to this invention, a bottom area is provided on the off-going seal, or seal mounting inside of the suction gland. This area is thus exposed to the suction in the gland during operation of the roll and the forces acting against this bottom, being dependent upon the sub-atmospheric pressures in the gland and the size of the area, will compensate for the tendency of suction in the evacuated holes to draw the seal tightly against the cylinder.

According to this invention the bottom area of the seal or seal mounting exposed to suction in the gland bears a definite relation to the total area of the holes or perforations registering at any one time with the top of the off-going seal so as to compensate for the tendency of the suction in these holes to draw up the seal.

It has been found that this bottom area, exposed to suction in the gland, should be about the same as the total area of the holes passing over the off-going seal at any one time.

Commercially, this bottom area is arrived at by setting the seals to urge against the cylinder with just the desired force to effect sealing. The cylinder is then blanketed to seal off the holes and is driven without operating the suction pump so that the seals are under atmospheric pressure on all sides thereof. The power required to drive the cylinder is noted, for example, by an ammeter reading if an electric driving motor is used. The pump is then operated substantially at capacity for creating a high vacuum in the gland. An ammeter reading is then again taken and compared with the original reading. The size of the bottom area is then regulated, bit by bit, until the vacuum seal is maintained at capacity of the pump and the ammeter reading is close to the original reading obtained when the suction pump was not used. This procedure will effect arrival at a desired vacuum exposed bottom area on the off-going seal or seal mounting for each suction roll, since it will then be known that the off-going seal is effective at the highest vacuum obtainable in the roll without unduly rubbing against the cylinder.

A feature of the invention includes the use of molded plastic material members for suction rolls. This plastic material can be reinforced with fabric or other means and can have colloidal graphite embedded therein to lubricate the active surfaces of the seal. The seals are L-shaped to provide upturned thick legs having cylinder engaging faces on the tops thereof and integral laterally extending horizontal legs accommodating flexible urging of the top faces of the vertical legs against the cylinder. The seals are mounted in cantilever fashion by anchoring the horizontal legs on the gland at points spaced from the vertical legs.

Another feature of the invention includes resilient deformable supports for the seals extending along the full length of the seals and capable of urging the seals against the inner face of the revolving cylinder with just the desired amount of pressure.

The seals of this invention are free from relatively moving adjacent surfaces and therefore cannot become clogged or rendered inoperative by material entering the cylinder.

It is, then, an object of this invention to provide suction rolls with balanced off-going seals which automatically maintain a desired contact with the revolvable perforated cylinder of the roll.

Another object of the invention is to balance the off-going seal of a suction roll for automatically offsetting the usual drag on the revolving cylinder caused by reduced pressure in the holes of the cylinder.

A specific object of the invention is to provide a bottom area on a floating off-going seal or seal carrier in a suction roll and to expose this area to the interior of the suction gland.

Another object of the invention is to provide one-piece seals for suction rolls resiliently accommodating relative movement.

Another object of the invention is to provide L-shaped one-piece seals for suction rolls capable of being resiliently anchored in cantilever fashion on the suction roll heads or glands.

Another object of the invention is to provide sensitive resilient supports for suction roll seals along the entire length of the seals.

A further object of the invention is to interpose resilient supports between a suction gland and the seals of a suction roll along the entire length of the seals.

On the drawings:

Figure 1 is a broken longitudinal cross-sectional view, with parts shown in elevation, taken through a suction roll equipped with seals according to this invention.

Figure 2 is a greatly enlarged fragmentary cross-sectional view taken along the line II—II of Figure 1.

Figure 3 is a cross-sectional view similar to Figure 2 but illustrating another embodiment of the invention.

Figure 4 is a fragmentary cross-sectional view of a portion of the off-going seal and support therefor illustrating the resilient support in an undeformed condition.

Figure 5 is a fragmentary cross-sectional view of an other embodiment of an off-going seal and seal mounting for a suction roll according to this invention.

As shown on the drawings:

As shown in Figure 1, the reference numeral 10 designates generally a suction roll. The suction roll 10 includes a shell or cylinder 11 having holes 11a therethrough around the entire circumference thereof. Heads 12 are bolted to the ends of the shell 11 and carry journals 13 projecting outwardly therefrom. Bearings (not shown) rotatably support the journals. The heads 12 are rotatably mounted on bearings 14 carried by stationary trunnions 15 and 16 extending into the journals 13. The trunnions 15 and 16 are secured to the end walls 17a and 17b of a suction head or gland 17 disposed in the shell 11.

The trunnion 15 is hollow and communicates at its inner end through an opening 18 with the interior of the suction head 17 and at its outer end with a suction pipe 19.

The cylinder 11 therefore has a stationary head or gland 17 therein and is revolvable around this head.

The above-described roll construction can be varied widely and forms no part of the instant invention.

According to this invention, however, the suction head 17, as best shown in Figure 2, has a pair of spaced parallel outturned flanges or arms 20 defining a passageway 21 to the interior of the head along the length of the head. The arms 20 are formed integrally with the head 17. A second pair of outturned flanges or arms 22 are formed integrally with the head 17 in spaced parallel relation from the arms 20. These arms 22 also extend along the full length of the head 17.

The tops of the arms 20 have oval-shaped recesses 23 therein and receive hollow rubber tubes or boots 24 along the entire length thereof.

The rubber tubes 24 are closed at their ends but communicate with branch pipes 25 and 26 sealed therein at the same ends thereof. These branch pipes 25 and 26 are joined to a pipe line 27 outside of the head 17. This pipe line extends into the trunnion 15 through the journal 13 and receives an outside air pressure supply line 28, as shown in Figure 1. This supply line 28 can have a pressure gauge 29 communicating therewith and a valve 29a for regulating air flow to the interiors of the rubber tubes.

Spring plates 30 are disposed on the tops of the arms 22 and extend laterally inward toward the arms 20. The spring plates 30 extend along the entire lengths of the arms 22.

Seals 31 of plastic material such as Bakelite have integral horizontal legs 31a bridging the gaps between the arms 20 and 22 and integral vertical legs 31b extending above the arms 20. The top faces 31c of the legs 31b form the active surfaces of the seals and cooperate with the inner face of the shell 11. The seals 31 have oval recesses 32 in the bottoms thereof receiving the tops of the tubes 24. The horizontal legs 31a are disposed over the spring plates 30 and a clamping bar or plate 33 is mounted over the end of each leg 31a. Bolts such as 34 extend through the bars 33, the legs 31a and the spring plates 30 into threaded relation in the tops of the arms 22. These bolts 33 clamp the seals 31 and spring plates 30 on the suction head 17 in a cantilever fashion.

The seals 31 extend longitudinally along the entire length of the passageway 21 on top of the arms 20 and are urged against the inside of the shell 11 by the spring plates 30 and inflated rubber tubes 24. The air pressure in the tubes 24 can be regulated to urge the seals 31 against the shell 11 with any desired force. The tubes 24, when undeformed, have cylindrical cross sections but are deformed into somewhat oval shape when loaded in the recesses 24 and 32.

The tubes hold the seals 31 in spaced relation above the tops of the arms 20.

As clearly shown in Figure 2, the off-going seal 31 has a bottom portion 35 exposed to the passageway 21 and the interior of the suction head 17 along the entire length of the longitudinal seal.

In operation, the shell 11 receives a wire or felt belt 36 therearound supporting a paper web W traveling around the shell 11 to be dried by passage over the suction area defined by the passageway 21 and the seals 31.

As shown in Figure 2, the holes 11a of the shell 11 receive columns of water 37 therein from the web W as they pass over the suction area. Since the web W and/or felt 36 seals the outer ends of these holes, the interiors of the holes become evacuated during passage over the suction area and are at sub-atmospheric pressures when they reach the off-going seal 31. These sub-atmospheric pressures in the holes tend to draw this off-going seal tightly against the shell 11. However, according to this invention, the seal 31 has been initially set into the correct pressure engagement with the shell 11 before the roll is placed in operation by the tubes 24 and spring plates 30, and any variation from this setting during use of the roll is not desired.

Therefore, according to this invention, the bottom area 35 on the off-going seal 31 exposed to the interior of the suction head 17 bears a definite relation to the total area of the holes 11a passing over this seal at any one time. Thus, the force exerted on this exposed bottom area 35 substantially balances the force exerted by the reduced pressure in the evacuated holes on the top of the seal 31, and maintains substantially the initial setting for the seal. For example, if the suction in the holes is the same as the suction in the gland, the area 35 should be equal to the total area of the holes registering at any one time with the seal.

The incoming seal 31 is not provided with an exposed bottom area in the gland since the holes are not evacuated when they pass over this seal.

The molded plastic seals 31, according to this invention, are not mounted in housings having wall surfaces for receiving the same and therefore these seals can never become stuck or clogged by fibers, loading material and the like solids which might enter into the shell. Impregnation of the seals with colloidal graphite renders their active surfaces self-lubricating, and these active surfaces are further lubricated by films of water maintained thereon. The seals will have a surprisingly long life and usually will last as long as the roll structure itself.

The provision of sensitive supports on one pair of arms and the provision of an anchor support on the other pair of arms of the suction gland makes possible the elimination of heretofore necessary complex mounting structure for suction roll seals.

In the embodiment shown in Figure 3, parts identical with parts described in Figures 1 and 2 have been marked with the same reference numerals. In Figure 3, however, the inflated tubes or boots 24 are replaced with foam rubber rods 40. These foam rubber rods 40 are preferably covered with a more dense rubber covering 41. The foam rubber is very sensitive and will deform evenly to resiliently urge the seals against the inner face of the shell 11 along the entire length of the seals. As shown in Figure 4, the rubber-covered foam rubber rods are circular in cross section in their undeformed condition. However, since oval shaped seats 23 and 32 are provided for these rods, they will be deformed into an oval shape in the seats when compressed as shown in Figure 3.

In the modification disclosed in Figure 4, a hollow spring metal tube 50 is used to resiliently support the seal 31. This spring metal tube 50 is preferably provided with a rubber cover 51 to insure uniform deformation of the tube in the recesses.

The tube and rubber cover 50 and 51 are circular in cross section when undeformed. This spring metal support for the seal, like the air-inflated boots and the foam rubber rods, is very sensitive and will serve to resiliently urge the seal 31 against the inner face of the shell 11.

From the above description it should be understood that this invention now provides a simplified seal structure for suction rolls free from complex seal mountings. The invention also provides for the resilient biasing of a cantilever mounted L-shaped seal member against the inner face of a suction roll cylinder. The seals of this invention are automatically adjusted to compensate for variations in vacuum maintained by the roll and these variations will not affect the efficiency of the seals or induce friction losses and wear.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a suction roll including a revolvable liquid-pervious cylinder, and a stationary suction gland mounted in said cylinder having an opening along the length thereof communicating with said cylinder, the improvements which comprise a pair of outturned arms on said gland on each side of said opening, L-shaped seal members disposed between said arms and said cylinder, each of said L-shaped members having a leg bridging the space between the arms on each side of the opening and an outturned leg adapted to contact the cylinder, and means disposed between said outturned legs and said arms resiliently supporting the seals along their entire lengths.

2. In a suction roll including a revolvable perforated cylinder, and a stationary suction gland in said cylinder having an opening communicating with said cylinder, the improvements which comprise spaced outturned arms on said gland on each side of said opening, L-shaped seals disposed between said arms and said cylinder on each side of the opening having laterally extending leg portions bridging the space between the arms on each side of the opening and outwardly extending leg portions adapted to contact the cylinder, means anchoring the ends of said laterally extending leg portions on the arms remote from said opening to provide a cantilever support for the seal, and resilient deformable means between said seals and said arms adjacent the opening for resiliently supporting the seals along their lengths.

3. In a suction roll including a revolvable perforated cylinder, and a stationary suction gland in said cylinder having an opening therein communicating with the cylinder, the improvements which comprise a pair of spaced outturned flanges on said gland on each side of said opening extending along the length of the gland, said flanges adjacent said opening having recesses in the tops thereof, deformable resilient means seated in said recesses along the lengths of said flanges, and seals anchored on the flanges remote from said opening and extending over said resilient means.

4. In a suction roll including a revolvable perforate cylinder and a stationary suction gland in said cylinder having a longitudinal opening communicating with the cylinder, the improvements which comprise an outturned flange on each side of said opening adjacent the opening, a second outturned flange on each side of the opening in spaced relation from said flanges adjacent the opening, spring plates disposed over said second flanges and extending toward said opening over the adjacent flanges, seal members disposed over said spring plates and anchored on said second flanges, said seals having outturned leg portions extending toward said cylinder above said flanges adjacent the opening, and resilient deformable means disposed between said flanges adjacent the opening and said outturned legs of the seals along the entire lengths of the seals to resiliently support the seals.

5. In a suction roll including a revolvable perforated cylinder, a stationary suction gland in said cylinder and a resiliently mounted independent off-going seal between said gland and said cylinder, the improvement which comprises a bottom area on said seal exposed to suction in the gland and sized relative to the total area of the holes passing over the seal at any one time for counteracting the tendency of the reduced pressure in the holes of the cylinder passing over the seal from drawing the seal against the cylinder.

6. In a suction roll including a revolvable perforate cylinder and a stationary gland in said cylinder having a pair of spaced outturned arms, the improvement which comprises an L-shaped seal member anchored on one of said arms and extending over the other of said arms, a deformable means disposed between the seal and the other arm, and said seal having a bottom area exposed to the interior of the gland.

7. In a suction roll having a metal cylinder having a plurality of holes therethrough, a stationary suction gland in said cylinder, and a seal between the suction gland and the cylinder, the improvement which comprises an extension on the bottom of said seal exposed to the interior of the suction gland, said extension having an area sized relative to the total area of the holes in said cylinder communicating with said seal at any one time for counteracting the effect of vacuum in the holes to maintain a substantial balance for the seal irrespective of the vacuum existing in the holes.

8. In a suction roll including a revolvable metal cylinder having a plurality of holes therethrough, a stationary suction gland in said cylinder having an opening communicating with said holes, a seal between said gland and said cylinder at the side of said opening, a resilient mounting for said seal, and said seal having a bottom area exposed to the interior of the gland substantially equal to the total area of the holes passing over the seal at any one time.

9. A suction roll comprising a revolvable metal cylinder having a plurality of holes therethrough, a stationary suction gland in said cylinder having an opening along the length thereof, a pair of spaced opposed outturned arms on said gland on each side of said opening, L-shaped seal members disposed over said arms on each side of said opening, said seal members having outturned leg portions adapted to contact the interior of the cylinder and laterally extending leg portions in spaced relation from the cylinder, means anchoring the ends of said laterally extending leg portions on the arms of the gland spaced from the opening, the ends of said arms adjacent the opening having oval recesses therein, and resilient deformable elongated members disposed in said recesses for resiliently urging the outturned legs of the seal against the cylinder, said outturned leg on the off-going seal of the roll having a bottom area communicating with the interior of the suction gland substantially equal to the total area of the holes passing over the seal at any one time.

10. The method of balancing off-going seals in suction rolls which comprises exposing a bottom area on the seal to the interior of the suction gland of the roll and regulating the size of said area in accordance with the total area of the holes in the cylinder communicating with the seal at any one time.

11. The method of counterbalancing off-going seals in suction rolls which comprises exposing a bottom area on said seal to the action of suction in the suction gland of the roll, determining the effect of suction in the evacuated holes of the roll cylinder passing over the seal and regulating the size of said bottom area to compensate for the reduced pressure in the evacuated holes.

EARL E. BERRY.